(12) United States Patent
Chen et al.

(10) Patent No.: US 7,450,376 B2
(45) Date of Patent: Nov. 11, 2008

(54) MOUNTING APPARATUS FOR DATA STORAGE DEVICES

(75) Inventors: Yun-Lung Chen, Tu-Cheng (TW); Jun Tang, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 319 days.

(21) Appl. No.: 11/317,543

(22) Filed: Dec. 23, 2005

(65) Prior Publication Data
US 2007/0025068 A1 Feb. 1, 2007

(30) Foreign Application Priority Data
Jul. 27, 2005 (CN) .................. 2005 2 0062229 U

(51) Int. Cl.
G06F 1/16 (2006.01)

(52) U.S. Cl. .................. 361/685; 361/683; 361/684

(58) Field of Classification Search ......... 361/679–687, 361/724–727; 312/223.1, 223.2; 248/222.11; 211/26; 365/151
See application file for complete search history.

(56) References Cited

U.S. PATENT DOCUMENTS

| | | | |
|---|---|---|---|
| 4,979,909 A | 12/1990 | Andrews | |
| 6,625,014 B1 | 9/2003 | Tucker et al. | |
| 6,646,872 B1 | 11/2003 | Chen | |
| 6,944,016 B2 * | 9/2005 | Chen et al. | 361/685 |
| 7,035,099 B2 * | 4/2006 | Wu | 361/685 |
| 7,102,885 B2 * | 9/2006 | Chen et al. | 361/685 |
| 2004/0095717 A1 * | 5/2004 | Hsu et al. | 361/685 |
| 2007/0019377 A1 * | 1/2007 | Chen et al. | 361/685 |

* cited by examiner

*Primary Examiner*—Lisa Lea-Edmonds
*Assistant Examiner*—Nidhi Desai
(74) *Attorney, Agent, or Firm*—Morris Manning & Martin; Tim Tingkang Xia, Esq.

(57) ABSTRACT

A data storage device assembly includes a data storage device having two opposite sidewalls, a supporting bracket, a positioning member mounted on the supporting bracket, a pressing member movably attached to the positioning member, and a driving member movably connected with the pressing member. The sidewalls of the data storage device form a first and second positioning post. The supporting bracket has a sidewall defines two guiding slots for receiving the first and second positioning post in a first direction. The pressing member defines a first receiving portion for receiving and locating the first positioning post in a second direction. The driving member has a driving portion. When the pressing member is pressed, the pressing member urges the driving portion to resist against the second positioning post, thereby causing the first positioning post to disengage from the first receiving portion and the corresponding guiding slot.

19 Claims, 4 Drawing Sheets

MOUNTING APPARATUS FOR DATA STORAGE DEVICES

BACKGROUND OF THE INVENTION

1. Field of the Invention

The present invention relates to mounting apparatuses, and more particularly to a mounting apparatus which readily secures a plurality of data storage devices therein and allows convenient removal of the data storage devices therefrom.

2. General Background

Data storage devices, such as hard disk drives, optical disk drives, and floppy disk drives, are crucial components for communications and handling of data in a computer system. In a computer enclosure of a typical personal computer, there are generally two disk drive brackets mounted therein. Usually, a variety of disk drives may be received in the disk drive brackets, which are then secured into the enclosure. There are many methods to mount data disk drives in the disk drive brackets in the enclosure. One conventional method is that many screws are employed to mount the data disk drives in the disk drive brackets. A conventional mounting apparatus includes an upper disk drive bracket and a lower disk drive bracket mounted in a computer enclosure. The opposite sides of upper and lower disk drive brackets define a plurality of through holes. A pair of joining edges is formed on opposite sides of a bottom of the lower disk drive bracket. Fixing holes are defined in the joining edges. The lower disk drive bracket is secured to a bottom of the upper disk drive bracket by screws. Then, a plurality of screws extends through the corresponding through holes of the upper and lower disk drive brackets to engage in threaded holes of disk drives, thereby securing the disk drives in the upper and lower disk drive brackets. However, not only securing the disk drive brackets is unduly painstaking and time-consuming, but also removal of the disk drives is similarly painstaking and time-consuming.

A typical mounting apparatus which utilizes screws and locating means for securing a data storage device in a computer enclosure is disclosed. The enclosure comprises a bottom plate and a side plate. The side plate forms a plurality of locating catches extending from an inner side thereof. The bottom plate includes a pair of slots and a pair of upright tabs. The data storage device defines a plurality of locating apertures in both sides thereof. A board is attached to an outside surface of the data storage device. From the board a pair of bars extrude from a bottom edge and a plurality of inward locating catches from an inner side thereof. In assembly, the data storage device is inserted into the enclosure along the side plate. When the data storage device reaches the upright tabs, the locating catches of the enclosure engages in the apertures of the data storage device, the locating bars of the board pivotally engaging in the slot of the bottom plate. A screw is then extended through the board to engage with the data storage device. However, the above-described operation of the mounting assembly is unduly complicated, and may result in damage to components in the enclosure.

What is needed, therefore, is a mounting apparatus with a simplified configuration, that conveniently allows the removal and attachment of a plurality of data storage devices from and into a computer enclosure.

SUMMARY

A data storage device assembly includes a data storage device having two opposite sidewalls, a supporting bracket, a positioning member securely mounted on the supporting bracket, a pressing member movably attached to the positioning member, and a driving member movably connected with the pressing member. One of the sidewalls of the data storage device has a first and second positioning post formed thereon. The supporting bracket has two opposite sidewalls, and one of the sidewalls defines two guiding slots for receiving the first and second positioning post in a first direction. The pressing member defines a first receiving portion for receiving and locating the first positioning post in a second direction perpendicular to the first direction. The driving member has a driving portion. When the pressing member is pressed, the pressing member urges the driving portion to resist against the second positioning post, thereby causing the first positioning post to disengage from the first receiving portion and the corresponding guiding slot.

Other advantages and novel features will be drawn from the following detailed description of preferred embodiments with the attached drawings, in which:

DETAILED DESCRIPTION OF THE EMBODIMENTS

Figure 1:
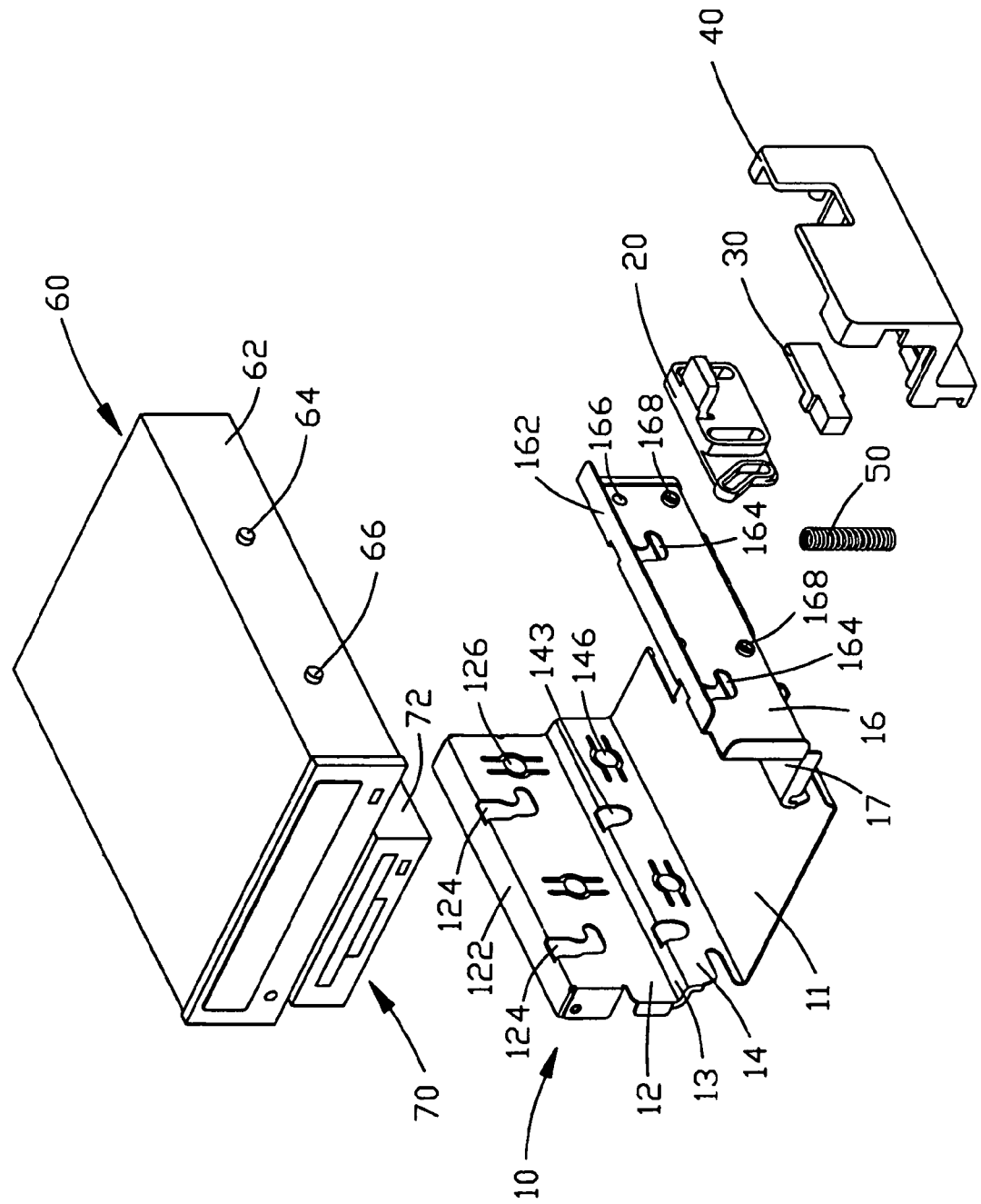
FIG. 1 is an exploded, isometric view of a mounting apparatus in accordance with a preferred embodiment of the invention, the mounting apparatus including a supporting bracket, a pressing member, a driving member, a positioning member, a spring, and a first and second data storage device.

Referring to FIG. 1, a mounting apparatus in accordance with a preferred embodiment of the invention which secures a plurality of data storage devices to a chassis of an electronic apparatus like a computer, includes a supporting bracket 10, a pressing member 20, a driving member 30, a positioning member 40, and a spring 50. In an alternative embodiment, the spring 50 can be other elastic components such as resilient cylinders.

The mounting apparatus in accordance with a preferred embodiment of the present invention secures a first data storage device 60 and a second data storage device 70 to a computer chassis (not shown). The first and second data storage device 60, 70 may be an optical disk drive and a floppy disk drive respectively. The first and second data storage device 60, 70 have two opposite sidewalls 62, 72 respectively. A first and a second positioning post 64, 66 extend from each of the sidewalls 62 of the first data storage device 60, and a first and a second positioning post (not visible) also extend from each of the sidewalls 72 of the second data storage device 70.

The supporting bracket 10 is secured to the chassis by a well-known means. The supporting bracket 10 includes a bottom wall 11 and two sidewalls. Each of the sidewalls is step-shaped. One sidewall of the supporting bracket 10 includes an upper sidewall 12, a lower sidewall 14, and a shoulder 13 vertically connected with the upper sidewall 12 and a lower sidewall 14. The other sidewall of the supporting bracket 10 also includes an upper sidewall 16, a lower sidewall 18 (not shown), and a shoulder 17 vertically connected with the upper sidewall 16 and the lower sidewall 18. A small space is formed by the two lower sidewalls 14, 18 and the bottom wall 11, for receiving the second data storage device 70, and a large space is formed by the upper sidewalls 12, 16 and the shoulders 13, 17, for receiving the first data storage device 60. The upper sidewalls 12, 16 are bent horizontally to form flanges 122, 162 at top edges thereof respectively. Two J-shaped guiding slots 124 are defined in the upper sidewall 12, and two J-shaped guiding slots 164 are also defined in the upper sidewall 16, corresponding to the two guiding slots 124. Two elastic protrusions 126 are formed on the upper sidewall 12, and two elastic protrusions 146 are also formed on the lower sidewall 14. A pair of U-shaped through slots 143 is defined in the lower sidewall 14, and a pair of U-shaped through slots 183 (shown in FIG. 3) is also defined in the lower sidewall 18, corresponding to the two U-shaped through slots 143. A pair of through holes 166 adjacent to the guiding slots 164 is defined in the upper sidewall 16, and a pair of through holes 186 adjacent to the through slots 183 (shown in FIG. 3) is defined in the lower sidewall 18. A pair of positioning holes 168 is defined in the upper sidewall 16 below the two through holes 166.

Figure 2:
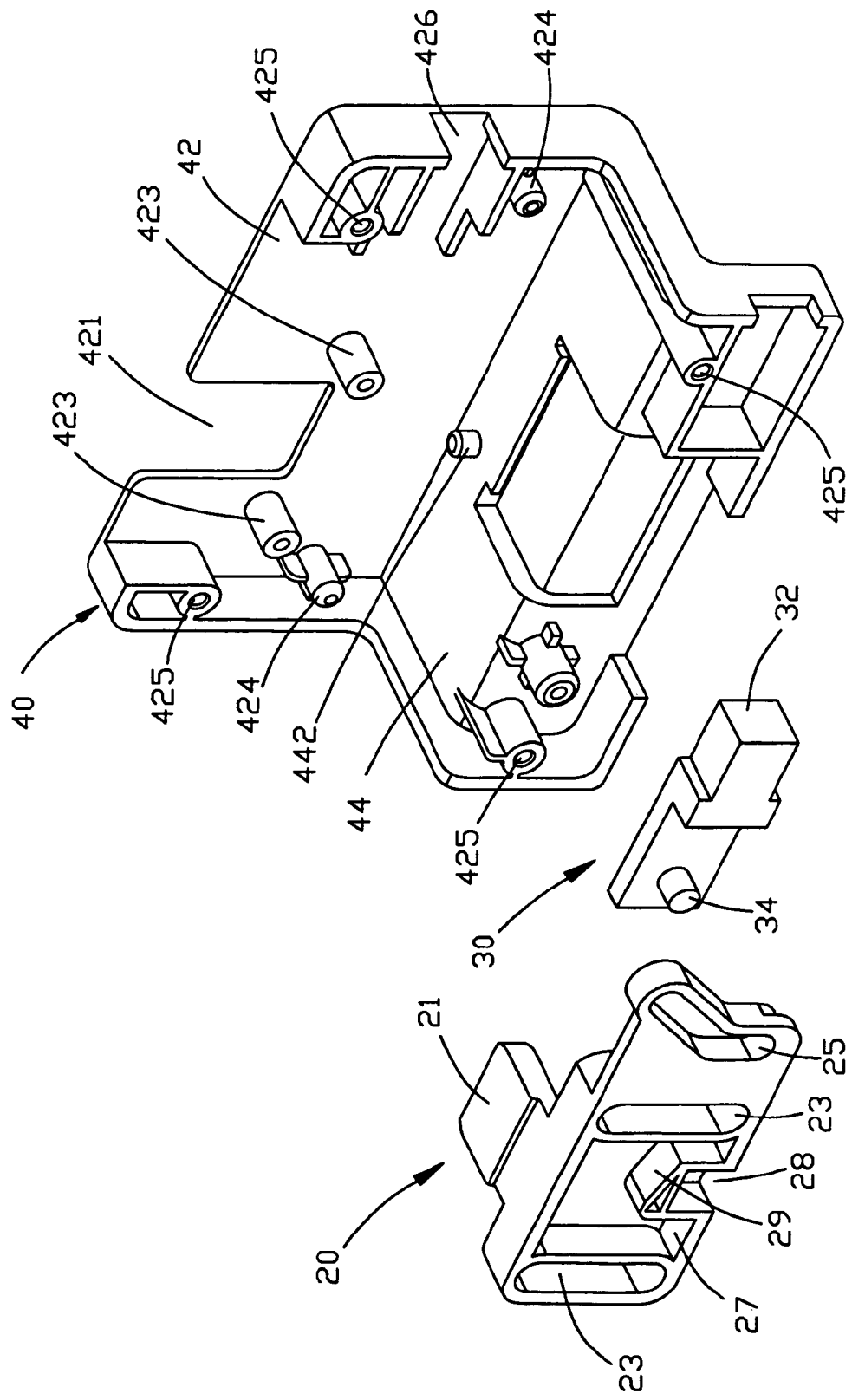
FIG. 2 is an enlarged view of the pressing member, the driving member, and the positioning member of FIG. 1.

Referring to FIG. 2, the pressing member 20 has a pressing portion 21 at a top end thereof. A pair of elongated through slots 23 is defined in the pressing member 20, and a V-shaped sliding slot 25 is defined at an end of the pressing member 20. A first receiving portion 27 is defined at an inner side of the pressing member 20, and a second receiving portion 28 adjacent to the first receiving portion 27 is also defined at a bottom end of the pressing member 20. A slanted guiding portion 29 is formed at the inner side of the pressing member 20 over the second receiving portion 28.

The driving member 30 is formed to have a driving portion 32 at one end thereof, and a circular post 34 extending horizontally from the driving member 30 at the other end thereof, corresponding to the V-shaped sliding slot 25.

The positioning member 40 is firmly secured to one sidewall of the supporting bracket 10. The positioning member 40 includes a vertical portion 42 and a horizontal portion 44. A rectangular cutout 421 is defined at a top end of the vertical portion 42, for the pressing portion 21 of the pressing member 20 sliding therein. A pair of sliding posts 423 adjacent to the cutout 421 extends from an inner side of the vertical portion 42, for sliding in a corresponding one of the through slots 23 respectively. A pair of locating posts 424 extends from the inner side of the vertical portion 42 below the two sliding posts 423. Two pairs of struts 425 extend from the inner side of the positioning member 40, corresponding to the through holes 166, 186. Each of the struts 425 has an internal threaded hole defined therein to engage with a fastening element (not shown), which may run through the through holes 166, 186 for securely fastening the positioning member 40 to the supporting bracket 10. A receiving portion 426 is defined at an end of the positioning member 40 between one of the locating posts 424 and one of the struts 425, for receiving the driving member 30 therein. An upright protruding pillar 442 extends from the horizontal portion 44 below the cutout 421, for locating the spring 50 thereon.

Figure 3:
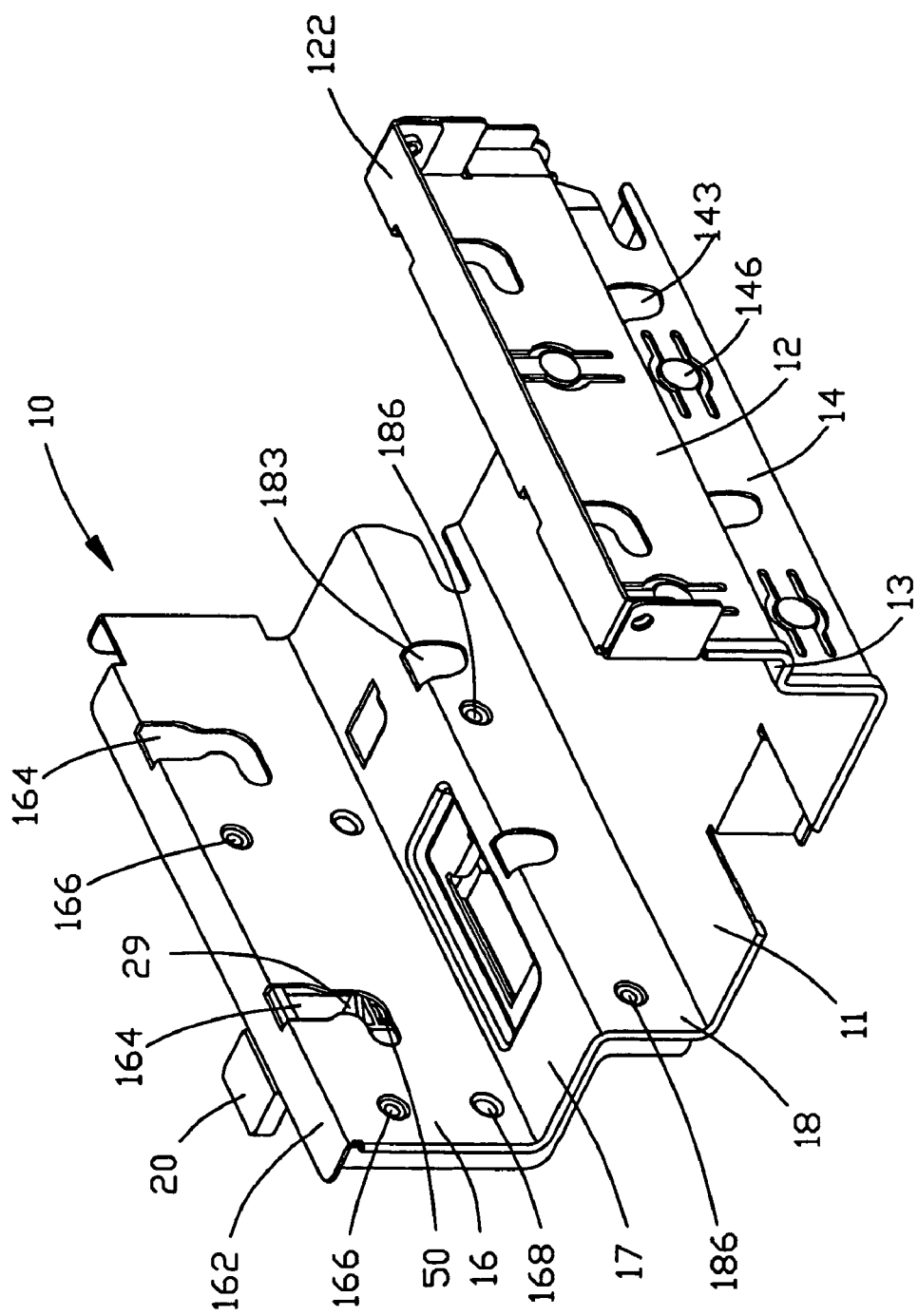
FIG. 3 is an assembled view of the mounting apparatus of FIG. 1, showing all of the other parts of the mounting apparatus except the data storage devices attached thereto.

Referring also to FIG. 3, before the first and second data storage device 60, 70 are attached to the supporting bracket 10, the pressing member 20, the driving member 30, and the positioning member 40 are assembled. Firstly, the circular post 34 of the driving member 30 extends through the sliding slot 25 of the pressing member 20. Each of the sliding posts 423 of the positioning member 40 extends through a corresponding one of the through slots 23 of the pressing member 20, and the pressing portion 21 of the pressing member 20 extends through the cutout 421 of the positioning member 40. Simultaneously, the driving member 30 is received in the receiving portion 426 of the positioning member 40. One end of the spring 50 is disposed on the protruding pillar 442, and the other end of the spring 50 is received in the second receiving portion 28 and resists against a top surface of the second receiving portion 28. Furthermore, each of the locating posts 424 runs though a corresponding one of the positioning holes 168 of the bracket 10. Four fastening elements are inserted through the through holes 166, 186 respectively to engage in a corresponding one of the threaded holes of the struts 425, thereby attaching the positioning member 40, the pressing member 20, and the driving member 30 to the supporting bracket 10. Thus, when the pressing member 20 is pressed down, the V-shaped sliding slot 25 of the pressing member 20 drives the circular post 34 of the driving member 30, thereby urging the driving member 30 to move horizontally.

Figure 4:
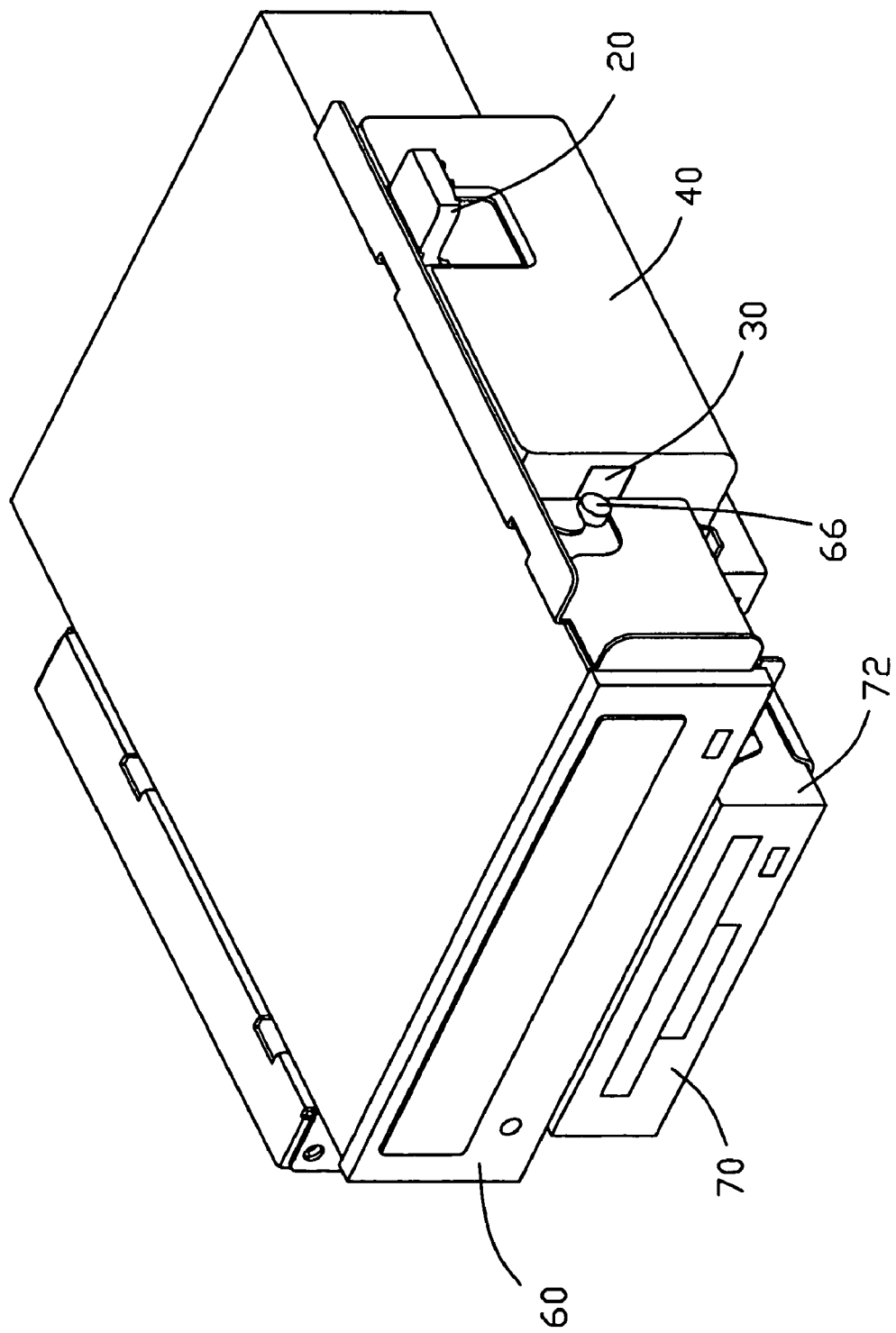
FIG. 4 is an assembled view of the mounting apparatus of FIG. 1.

Referring to FIG. 4, in attachment of the first and second data storage device 60, 70, the first and second positioning post of the second data storage device 70 are first engagingly received in the through slots 143, 183 of the lower sidewalls 14, 18 respectively, thereby disposing the second data storage device 70 on the bottom wall 11 of the supporting bracket 10. Then, the first and second positioning post 64, 66 of the two sidewalls 62 of the first data storage device 60 slide into the J-shaped guiding slots 124, 164 of the upper sidewalls 12, 16 respectively. The positioning post 64 presses the guiding portion 29 of the pressing member 20 to urge the pressing member 20 to move downwardly. Simultaneously, the spring is compressed. When the guiding portion 29 is below a bottom end of the guiding slot 164, the first positioning post 64 can slide into the first receiving portion 27, and the first positioning post 64 is located in a perpendicular direction. Simultaneously, the pressing member 20 moves upward due to rebounding of the spring 50. Therefore, the first positioning post 64 is located in the first receiving portion 27 in a horizontal direction. Thus, the first data storage device 60 is securely mounted in the supporting bracket 10 over the second data storage device 70. Simultaneously, a bottom wall of the first data storage device 60 presses against a top wall of the second data storage device 70, thereby firmly securing the second data storage device 70.

In removal of the first and second data storage device 60, 70, the pressing portion 21 of the pressing member 20 is first pressed down until the guiding portion 29 of the pressing member 20 is moved below the bottom end of the guiding slot 164. The top surface of the second receiving portion 28 compresses the spring 50. Simultaneously, the sliding slot 25 of the pressing member 20 drives the circular post 34 of the driving member 30, thereby urging the driving portion 34 of the driving member 30 to move horizontally. Simultaneously, the driving member 30 resists against the second positioning post 66, thereby moving the first data storage device 60 horizontally until the first positioning post 64 is on the guiding portion 29 of the pressing member 20. Then, the pressing member 20 is urged up due to rebounding of the spring 50 when the pressing portion 21 of the pressing member 20 is released. Simultaneously, the guiding portion 29 guides the first positioning post 64 along the guiding slot 164. Consequently, the first data storage device 60 may be conveniently drawn out from the supporting bracket 10. After the first data storage device 60 is removed from the supporting bracket 10, the second data storage device 70 is lifted up to urge the first and second positioning post of the data storage device 70 to disengage from the corresponding through slots 143, 183. Thus, the second data storage device 70 is easily drawn out from the supporting bracket 10.

While the present invention has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present invention will readily appear to those skilled in the art. Therefore, the present invention is not limited to the specific details and illustrative examples shown and described.

We claim:

1. A data storage device assembly comprising:
   a data storage device having two sidewalls, one of the sidewalls having a first positioning post;
   a supporting bracket for accommodating the data storage device, the supporting bracket having two sidewalls, one of the sidewalls defining a guiding slot for locating the first positioning post of the data storage device in a first direction substantially parallel to the one of the sidewalls of the supporting bracket;
   a pressing member movably attached to the one of the sidewalls of the supporting bracket, the pressing member defining a first receiving portion for receiving and locating the first positioning post of the data storage device in a second direction perpendicular to the first direction and substantially parallel to the one of the sidewalls of the supporting bracket; and
   an elastic component for urging the pressing member to move in the first direction, wherein the first positioning post of the data storage device slides into the first receiving portion along the guiding slot, the pressing member is moved in the first direction due to the elastic component, and the first positioning post is located by the first receiving portion in the second direction.

2. The data storage device assembly as described in claim 1, further comprising a positioning member securely mounted on the supporting bracket for the pressing member sliding thereon.

3. The data storage device assembly as described in claim 2, further comprising a driving member movably connected with the pressing member, and one of the sidewalls of the data storage device further has a second positioning post for the driving member resisting against, thereby moving the data storage device.

4. The data storage device assembly as described in claim 3, wherein the positioning member defines a receiving portion for the driving member sliding therein.

5. The data storage device assembly as described in claim 3, wherein the driving member forms a circular post, and the pressing member defines a sliding slot for the circular post sliding therein.

6. The data storage device assembly as described in claim 2, wherein the pressing member has a pressing portion, and the positioning member defines a cutout for the pressing portion sliding therein.

7. The data storage device assembly as described in claim 2, wherein the positioning member forms at least one sliding post, and the pressing member defines at least one through slot for the sliding post sliding therein.

8. The data storage device assembly as described in claim 2, wherein the pressing member defines a second receiving portion for receiving an end of the elastic component, and the positioning member forms a protruding pillar for locating the elastic component.

9. The data storage device assembly as described in claim 1, wherein the pressing member forms a guiding portion for the first positioning post of the data storage device sliding thereon.

10. A data storage device assembly comprising:
    a data storage device having a pair of opposite sidewalls, one of the sidewalls having a first positioning post and a second positioning post;
    a supporting bracket for accommodating the data storage device, the supporting bracket having a pair of opposite sidewalls, one of the sidewalls defining two guiding slots for locating the first and second positioning post of the data storage device in a first direction;
    a pressing member movably attached to one sidewall of the supporting bracket, the pressing member defining a first receiving portion for receiving and locating the first positioning post of the data storage device in a second direction perpendicular to the first direction; and
    a driving member movably connected with the pressing member, the driving member having a driving portion for driving the second positioning post of the data storage device in the second direction, thereby moving the data storage device, whereby when the pressing member is pressed, the pressing member urges the driving portion to resist against the second positioning post, thereby causing the first positioning post to disengage from the first receiving portion.

11. The data storage device assembly as described in claim 10, further comprising a positioning member securely mounted on the supporting bracket for the pressing member and the driving member sliding thereon.

12. The data storage device assembly as described in claim 11, further comprising an elastic component sandwiched between the pressing member and the positioning member, for urging the pressing member.

13. The data storage device assembly as described in claim 12, wherein the pressing member defines a second receiving portion for receiving an end of the elastic component, and the positioning member forms a protruding pillar for locating the elastic component.

14. The data storage device assembly as claimed in the claim 11, wherein the positioning member defines a receiving portion for the driving member sliding therein.

15. The data storage device assembly as described in the claim 11, wherein the pressing member has a pressing portion, and the positioning member defines a cutout for the pressing portion sliding therein.

16. The data storage device assembly as described in the claim 11, wherein the positioning member forms at least one sliding post, and the pressing member defines at least one through slot for the sliding post sliding therein.

17. The data storage device assembly as described in the claim 10, wherein the pressing member forms a guiding portion for the first positioning post of the data storage device sliding thereon.

18. The data storage device assembly as described in the claim 10, wherein the driving member forms a circular post, and the pressing member defines a sliding slot for the circular post sliding therein, thereby guiding the driving member.

19. An electronic apparatus comprising:
    a functional device of said electronic apparatus removably installable in said electronic apparatus for functional extension thereof;
    a supporting bracket installable in said electronic apparatus for accommodating said device, said device movable in said bracket between a first position thereof where said device is secured to said bracket and a second position thereof where said device is free to remove out of said bracket;
    an integrated pressing member movably attachable to said bracket along a linear direction and capable of securing said device to said bracket in said first position thereof when said device moves from said second position thereof to said first position thereof, movement of said pressing member after securing said device to said bracket capable of releasing said device in said first position thereof and simultaneously urging said device to move from said first position thereof to said second position thereof; and a driving member movably and connectively engaging with said pressing member and extending away from said pressing member, said driving member being urged by said pressing member to resist against a positioning post of said device unreachably spaced from said pressing member so as to cause disengagement of said device from said pressing member.

* * * * *